Patented Aug. 21, 1928.

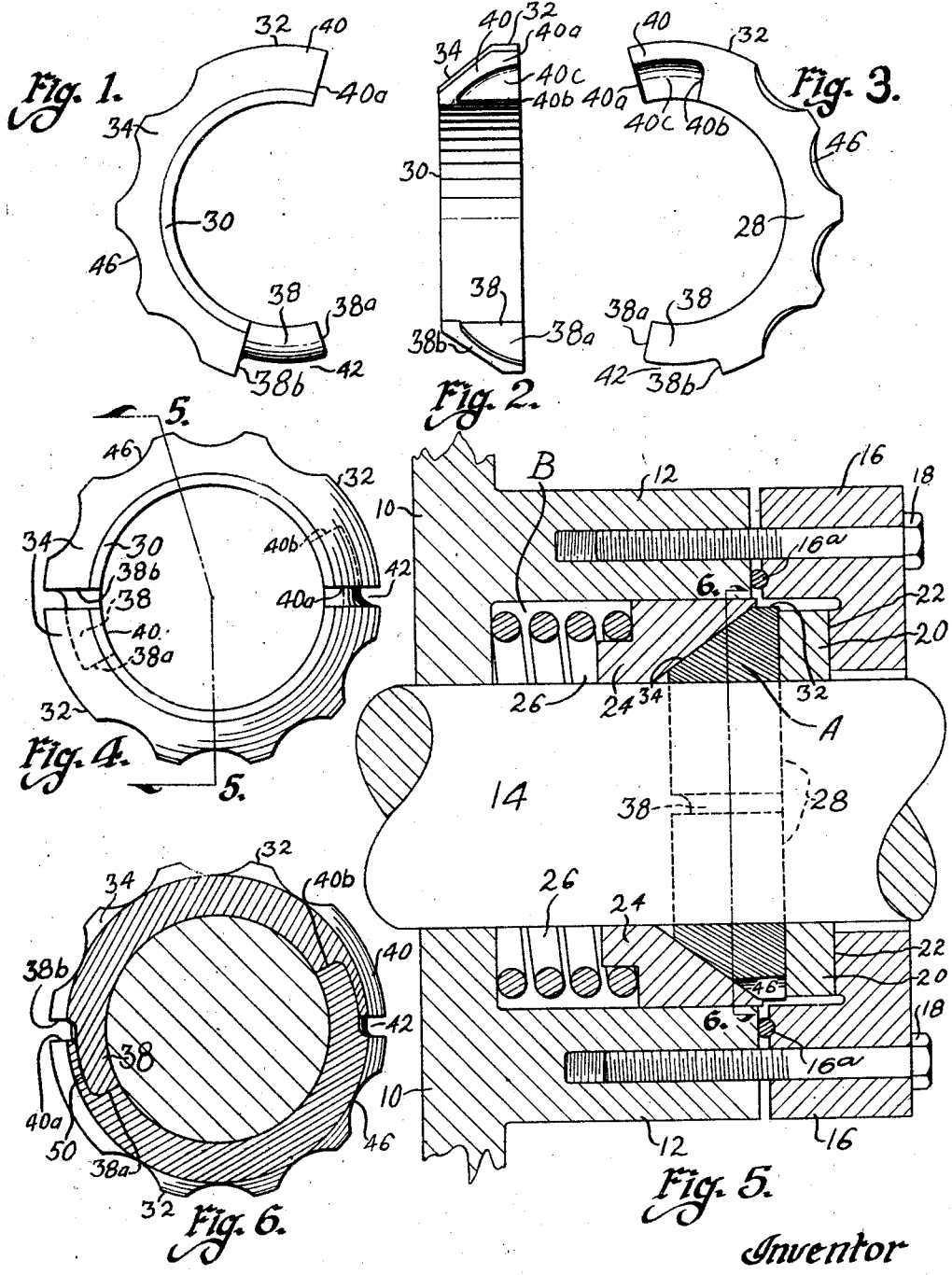

1,681,770

UNITED STATES PATENT OFFICE.

RUDOLPH H. KAUTZKY, OF DES MOINES, IOWA, ASSIGNOR TO WALTER L. KAUTZKY, OF DES MOINES, IOWA.

METALLIC PACKING RING.

Application filed September 6, 1927. Serial No. 217,758.

My invention has to do with metallic packing rings used for example, on piston rods of steam engines.

The object of my invention is to provide a metallic packing ring composed of two sections and having joints of a peculiar construction which interlock the two sections into an indistortable ring unit and having no sharp joint edges or weak body portions subject to breakage.

Still a further object is to provide such a metallic packing ring having joint ends each member of which has spaced substantially radially arranged shoulders and intermediate portions, the surfaces of which are substantially concentric with the rod on which the packing is mounted which practically eliminates any frictional joint resistance to automatically closing and taking up as wear sets in.

Still a further object is to provide such a metallic packing ring provided with recesses or cups in its periphery for affording greater body flexibility and lighter weight, and greater surface area for pressure to exert itself on the packing ring radially, so that it will more readily conform to a non-leakable joint at all times.

Generally speaking, it is my object to provide a semisectional metallic packing ring which on account of the novel features of construction briefly mentioned above and hereinafter more fully set forth, will effectively meet the severe conditions of modern service and give a longer and more serviceable life than is being obtained from the packing rings now in use.

One of the important purposes of my present invention is to provide such a packing ring, the sections of which when assembled on the rod to be packed, interlock themselves into a unit which cannot be distorted out of its proper position in service.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is what may be called, a plan view of one side of a section of my improved metallic packing ring.

Figure 2 is an end elevation of the section shown in Figure 1 viewed from the inside of the ring.

Figure 3 is an inverted plan view of the same section.

Figure 4 is a plan view of the completed ring made of two of the sections shown in Figure 1.

Figure 5 is a detail sectional view through a portion of a cylinder head and stuffing box through which projects a piston rod equipped with a metallic packing ring embodying my invention shown in section on the line 5—5 of Figure 4; and Figure 6 is a detail sectional view taken on the line 6—6 of Figure 5.

For greater convenience in explaining my metallic packing, I will first refer to one of the possible environments in which the packing may be used.

In Figure 5 I have shown a portion of a steam cylinder indicated on the drawings by the reference character 10. On its outer face the head 10 has an annular projecting flange 12. Journaled in the portion shown on the head 10, is a piston rod 14. The stuffing box gland 16 rests against the gasket 16$^a$ arranged between it and the annular flange 12 as shown and is bolted thereto as at 18 and has the rod 14 extended through it.

Adjacent to the inner surface of the gland 16 is a straight joint ring 20. Between the joint ring 20 and the packing gland 16 is a ground surface joint as indicated at 22. Next to the joint ring 20 is the flat face of my improved sectional metallic packing ring which ring is indicated generally by the character A.

Adjacent to the tapered side of the ring A is a cone cup 24 which is yieldingly pressed against the ring A by means of the coil spring 26.

It is of great importance and very difficult to provide a substantially constant steam tight joint around the piston rod 14 where it emerges from the cylinder. Such a joint is afforded by my present invention.

My improved metallic packing ring is made in two sections each of which extends a little more than half way around the rod 14. The sections are exactly alike. The inner face of each section is made to conform to the shape of the piston rod 14 except for a short distance at one end where the joint member hereinafter described, is formed. Each section has what is for convenience called, the outer face 28, in a plane at right angles to the shaft 14 and a narrow inner face 30 in a corresponding parallel plane.

Adjacent to the face 28 each section has an annular outer surface portion 32 concentric with the shaft 14. Between the surface portion 32 and the face 30, the outer surface of the ring section is inclined or doubled or tapered as shown at 34.

The cross sectional shape of each section at most points in its length, is perhaps best illustrated at the upper part of Figure 5. One advantage in making the rod bearing surface of each section extend around a little more than a half circle is that each section when applied on the piston rod 14 will retain itself thereon prior to the assembling or application of the other segment.

At one end of each ring section is a joint member 38 and at the other end is a joint member 40. The inner surface of the joint member 40 is cut away to form shoulders 40ª and 40ᵇ spaced circumferentially of the rod 14 and affording a recess 40ᶜ which in cross section, extends from the inner surface of the ring spaced from the face 30 outwardly and toward the face 28 as shown in Figure 2. At the other end of each section, the outer surface of the material is cut away as indicated at 42 in Figure 1 to leave the joint member 38 adapted to slide into the recess 40ᶜ except only that the joint member 38 is longer circumferentially of the section than the joint member 40.

Thus when two of the sections are placed together, the joint section 38 of each section fits into the recess 40ᶜ of the other section. The joint section 38 has circumferentially spaced shoulders 38ª and 38ᵇ which are in planes substantially radial of the rod 14.

When the two sections are assembled together, each shoulder 38ª engages a shoulder 40ᵇ of the adjacent section but because the joint member 38 is longer than the joint member 40, the shoulders 40ª and 38ᵇ are spaced apart as illustrated for instance, in Figure 6.

On the outer surface of the ring sections between the joints, the ring sections are provided with a plurality of pockets 46, to facilitate greater body flexibility and lighter weight and to provide greater surface area for pressure to exert itself radially on the packing ring.

Assuming that two of the sections are fitted together in the manner hereinbefore referred to and in the assembly shown in Figure 5, steam will then pass from the interior of the cylinder into the chamber B in which the spring 26 and the packing ring assembly are located.

In practice, steam will leak around the follower 24 and pressure will be inserted inwardly upon the surface 32 and upon the surfaces of the pockets 46. The pockets 46 are distributed around a ring with substantial uniformity so that the pressure on the packing ring will be distributed around the ring for pressing it against the piston rod 14 and thus making a uniformly steam tight joint between the inner face of the packing ring and the rod 14. This also aids in avoiding distortion of the packing ring.

Thus there is provided in the present metallic packing ring, a two part ring each of the sections of which extend a little more than half way around the piston rod so that when slipped on the piston rod, it will remain in position thereon. The sections each have one flat face in the plane at right angles to the axis of the piston rod and one inclined or beveled face with an intermediate face substantially parallel with that of the piston rod.

The overlapping portions of the lap joints as indicated for instance at 50 in Figure 6, while they are inclined from side edge to side edge, are arranged circumferentially of the ring in lines concentric to the interior surface of the ring and the piston rod.

I claim as my invention:

A metallic packing ring comprising a pair of similar sections having overlapping joints with radial shoulders, the inner overlapped joint portions being longer than the outer overlapping joint portions, the cross sectional areas of the inner shoulders being less than the cross sectional areas of the outer shoulders, the inner shoulders abutting for resisting the friction of the packing ring excessive of what is necessary to maintain a tight joint on its rod, and the outer shoulders not abutting to allow the two sections to automatically take up and close uniformly as wear sets in, each section having a side face in a plane at right angles to the axis of the ring and an inclined side face and an intermediate outer face concentric with the axis of the ring, the outer portion of each section being provided with regularly spaced recesses of substantial, circumferential length and of width greater than that of the outer, intermediate face, so as to extend into the inclined face, whereby the ring will be afforded flexibility and the thicker portion thereof will be subjected to inward radial pressure over substantial areas, thus maintaining the packing ring in an undistortable steam-tight condition at all times.

Des Moines, Iowa, August 26, 1927.

RUDOLPH H. KAUTZKY.